(12) United States Patent
Green

(10) Patent No.: US 7,447,214 B2
(45) Date of Patent: Nov. 4, 2008

(54) LINK CAPACITY ADJUSTMENT SCHEME

(75) Inventor: Michael Green, Central Valley, NY (US)

(73) Assignee: Fujitsu Limited, Kawasaki (JP)

( * ) Notice: Subject to any disclaimer, the term of this patent is extended or adjusted under 35 U.S.C. 154(b) by 1067 days.

(21) Appl. No.: 10/652,077

(22) Filed: Sep. 2, 2003

(65) Prior Publication Data

US 2005/0047419 A1 Mar. 3, 2005

(51) Int. Cl.
*H04L 12/28* (2006.01)
(52) U.S. Cl. .................. 370/395.51; 370/907
(58) Field of Classification Search .............. None
See application file for complete search history.

(56) References Cited

U.S. PATENT DOCUMENTS

| | | | |
|---|---|---|---|
| 7,058,008 B1* | 6/2006 | Wilson et al. | 370/216 |
| 2004/0120362 A1* | 6/2004 | Chohan et al. | 370/907 |
| 2004/0252633 A1* | 12/2004 | Acharya et al. | 370/216 |
| 2005/0281197 A1* | 12/2005 | Honda | 370/235 |
| 2006/0140225 A1* | 6/2006 | Christensen et al. | 370/536 |

OTHER PUBLICATIONS

"Virtual Concatenation Tutorial: Enhancing SONET/SDH Networks for Data Transport", L. Choy, Jan. 2002; vol. 1, No. 1; Journal of Optical Networking, pp. 18-29.
"Link Capacity Adjustment Scheme for Virtual Concatenated Signals" ITU-T G. 7042/Y.1305, Nov. 2001 pp. 1-25; XP002216519.

* cited by examiner

*Primary Examiner*—Firmin Backer
*Assistant Examiner*—Roberta A. Shand
(74) *Attorney, Agent, or Firm*—Hanify & King, PC

(57) ABSTRACT

A system and method provides the capability to provision and setup an end-to-end circuit that does not require the performance of extra, manual management link addition/removal procedures after all facilities and VT/STS cross connections have been provisioned. A method of provisioning a circuit comprises the steps of provisioning an Ethernet port facility, including determining a members of a Link Capacity Adjustment Scheme Virtual Concatenation Group before virtual tributary or synchronous transport signal cross connections are provisioned and before Synchronous Optical Network or Synchronous Digital Hierarchy cross-connections are provisioned; provisioning virtual tributary or synchronous transport signal cross connections; and provisioning Synchronous Optical Network or Synchronous Digital Hierarchy cross-connections.

6 Claims, 11 Drawing Sheets

Fig. 6

| VC Overhead Designation | Description | Used by this invention's Implementation of LCAS |
|---|---|---|
| CTRL | Used by the Source to request actions by its corresponding Sink. | Y |
| GID | A number to identify the VC group. | Y |
| CRC-n | Checksum over all protocol-bytes in the VC multi-frame that contains it. | Y |
| RS-ACK | Used by the Sink to signal to acknowledge certain Source requests. | Y |
| Member Status | Used by the Sink to send the current status of all members in the VC group to source. | Y |
| Sequence Indicator | Identifies the VC group member that the GID and CTRL information correspond to. (For N VC group members, the Sequence Indicator can be a number from 0 to N-1 .) | Y (Also needed for VC without LCAS) |

Fig. 7

| LCAS Source States | CTRL Designation | CTRL Value (Binary) | Description | Supported by this invention |
|---|---|---|---|---|
| S-IDLE | IDLE | 0101 | This member is not provisioned to participate in the concatenated group | N; however, receipt of is supported CTRL=IDLE |
| S-NORM | NORM | 0010 | This member is provisioned to participate in the concatenated group and has a good path to the sink end. | Y |
| S-DNU | DNU | 1111 | This member is provisioned to participate in the concatenated group and has a failed path to the sink end. | Y |
| S-ADD | ADD | 0001 | This member is in the process of being added to the concatenated group.. | N |
| S-REMOVE | n/a | n/a | This member is in the process of being deleted from the concatenated group | N |
| n/a | EOS | 0011 | This is last member in the VC Group (highest Sequence number). | Y |
| | | | | |

Fig. 8

| LCAS Sink States | Member Status | Member Status Value | Description | Supported by this Invention |
|---|---|---|---|---|
| S-IDLE | n/a | n/a | This member is not provisioned to participate in the concatenated group. | N |
| S-OK | OK | 0 | The incoming signal for this member experiences no failure condition or | Y |
| | | | has received and acknowledged a request for addition of this member | N |
| S-FAIL | FAIL | 1 | The incoming signal for this member experiences some failure condition or | Y |
| | | | or an incoming request for removal of a member has been received and acknowledged | N |

Fig. 9

| Addressing | Message | Description | Supported by this Invention |
|---|---|---|---|
| From VCG Member(i) Source to VCG Member(i) Sink via CTRL | F-IDLE | Indication that this STS-N is currently not a member of the group and no ADD requests are pending | Rx: Y Tx: N |
| | F-ADD | Request to add this channel to the group | N |
| | F-DNU | Request to delete this channel from the group | Y |
| | F-EOS | Indication that this member has the highest sequence number in the group | Y |
| | F-NORM | Indication that this member is normal part of the group and does not have the highest sequence number. | Y |
| From local VCG member(i) to local VCG member(i-l) | C-EOS | Indication that Member (i-l) should change transmitted CTRL word to EOS | Y |
| | C-NORM | Indication that Member (i-l) should change transmitted CTRL word to NORM | Y |
| From VCG member(i) Sink to VCG member(i) Source via Member Status.a | R-FAIL | Sink member status FAIL. | Y |
| | R-OK | Sink member status is OK | Y |
| Local Management System to Source VCG. | M-Add | Management System request to add a new member to the VCG. | N |
| | M-Remove | Managment Systen request to remove a member from the VCG. | N |
| Sink VCG to Source VCG | R-RS-ACK | Used to acknowledge the detection at the sink side of a renumbering of the sequence or the reception at the sink side of the F-IDLE message. | Y |
| Local SONET STS processing for VCG member(i)to VCG member(i) | SSF | SONET STS Fail. | Y |

Fig. 10

| Initial State | Stimulus | Priority | Action | Final State |
|---|---|---|---|---|
| S-NORM | Rx: C-NORM | Low | Tx: F-NORM | S-NORM |
| | Rx: C-EOS | Low | Tx: F-EOS | S-NORM |
| | Rx: R-FAIL | High | 1) If the source member is the last, then<br>    Tx: C-EOS to member(i-l).<br>2) Tx: F-DNU | S-DNU |
| S-DNU | Rx: C-EOS | Low | Tx: C-EOS to member(i-1).<br>Tx: F-DNU | S-DNU |
| | Rx: C-NORM | Low | Tx: C-NORM to member(i-1)<br>Tx: F-DNU | S-DNU |
| | Rx: R-OK | High | 1) If the source member is the last, then<br>    Tx: F-EOS and TX: C-NORM to member( i-1 )<br>else<br>    Tx: F-NORM | S-NORM |

Fig. 11

| Initial State | Stimulus Priority | Action | Final State |
|---|---|---|---|
| S-OK | Rx: SSF | Tx: R-FAIL | S-FAIL |
| | Low | | |
| | Rx: F-IDLE | Tx: R-FAIL | S_FAIL |
| | High | | |
| S-FAIL | Rx: Not-SSF | If Rx: F-IDLE Tx: R-FAIL | S-FAIL |
| | | If not Rx: F-IDLE Tx: R-OK | S-OK |

LINK CAPACITY ADJUSTMENT SCHEME

FIELD OF THE INVENTION

The present invention relates to a system and method for provisioning an Ethernet port facility and a Link Capacity Adjustment Scheme Virtual Concatenation Group before virtual tributary or synchronous transport signal cross connections are provisioned before Synchronous Optical Network or Synchronous Digital Hierarchy cross-connections are provisioned.

BACKGROUND OF THE INVENTION

Current industry standards (ITU-G.7042) that provide a Link Capacity Adjustment Scheme (LCAS) for virtually concatenated (VCAT) Synchronous Optical Network (SONET) virtual tributaries (VTs) or synchronous transport signals (STSs) specify an operational protocol, LCAS. As specified in these industry standards, LCAS employs both manual or management triggered link addition/removal procedures and automatic addition/removal procedures in a single state machine scheme. The virtual concatenation source and sink adaptation functions of LCAS provide a control mechanism to hitlessly increase or decrease the capacity of a Virtual Concatenation Group (VCG) link to meet the bandwidth needs of an application. It also provides the capability of temporarily removing member links that have experienced a failure. LCAS assumes that in cases of capacity initiation, increase, or decrease, the construction or destruction of the end-to-end path of each individual member is the responsibility of the Network and Element Management Systems. For example, the standards specify that LCAS may be used to increase or decrease the capacity of a container that is transported in a Synchronous Digital Hierarchy/Optical Transport Network (SDH/SONET) network using Virtual Concatenation. In addition, LCAS protocol supports the automatic decrease of capacity if a member experiences a failure in the network, and increase the capacity when the network fault is repaired. The scheme is applicable to every member of the VCG.

Management systems for delivering Ethernet-over-SONET (EOS) services will most likely be built on Time Division Multiplex (TDM) management systems that deliver T1/T3/OCn services. The TDM systems employ procedures to provision:

Endpoint T1/T3/OCn facilities
Local VT/STS cross-connections to these facilities
A number of VT/STS cross-connections in network elements in the transport network between the endpoints With all of these network entities provisioned, an end-to-end circuit is setup that is ready to provide T1/T3/OCn service. For EOS services that employ multiple VTs/STSs, LCAS procedures permit this service to gracefully degrade (reduce the transported data bandwidth) in the presence of VT/STS failures. The current industry standard for LCAS indicates the use of manual management link addition/removal procedures only after all facilities and VT/STS cross connections have been provisioned, but before the end-to-end circuit is setup (ready for use). However, problems arise due to the need to perform this extra, manual step before the end-to-end circuit is ready to use. No existing schemes based on the industry standard LCAS address the issue of the need for an extra provisioning step after all facilities and cross-connections are in place. A need arises for a technique with which such a circuit may be provisioned and setup that does not require this extra, manual step.

SUMMARY OF THE INVENTION

The present invention provides the capability to provision and setup an end-to-end circuit that does not require the performance of extra, manual management link addition/removal procedures after all facilities and VT/STS cross connections have been provisioned. The present invention uses an implementation of LCAS based on the automatic addition/removal procedures of the current standards, but introduces modifications to these procedures and also introduces protocol extensions. These modifications to the procedures and protocol extensions provide the capability to perform management link addition/removal procedures in an automated fashion, rather than the manual steps required by the prior art. Using the present invention, an end-to-end circuit is setup using only TDM management provisioning procedures, but still supports the standard LCAS procedures for data bandwidth adjustment in the presence of VT/STS failures.

In one embodiment of the present invention, a method of provisioning a circuit comprises the steps of provisioning an Ethernet port facility, including determining a members of a LCAS VCG before VT or STS cross connections are provisioned and before SONET or SDH network cross-connections are provisioned; provisioning VT or STS cross connections; and provisioning cross connections in the SONET or SDH network.

The step of provisioning the Ethernet port facility may comprise the step of provisioning the Ethernet port facility so that VCG members that are not associated with a VT or STS cross connection return an LCAS sink status of FAIL and VCG members that are not associated with a VT or STS cross connection enter an operational LCAS source state of "Do Not Use" (DNU).

The method may further comprise the step of using LCAS source and sink adaptation functions, automatically activating the VCG members.

The step of using LCAS source and sink adaptation functions, automatically activating the VCG members may comprise the step of causing the VCG members to have an LCAS sink status of OK and an operational LCAS source state of NORM or EOS.

BRIEF DESCRIPTION OF THE DRAWINGS

The details of the present invention, both as to its structure and operation, can best be understood by referring to the accompanying drawings, in which like reference numbers and designations refer to like elements.

FIG. 6 is an exemplary table of Virtual Concatenation overhead bytes that are used by the present invention.

FIG. 7 is an exemplary table of LCAS source states and control values that are used by the present invention.

FIG. 8 is an exemplary table of LCAS sink states that are used by the present invention.

FIG. 9 is an exemplary table of LCAS state machine control messages that are used by the present invention.

FIG. 10 is an exemplary table of LCAS source state machine states that are used by the present invention.

FIG. 11 is an exemplary table of LCAS sink state machine states that are used by the present invention.

DETAILED DESCRIPTION OF THE INVENTION

Figure 1:
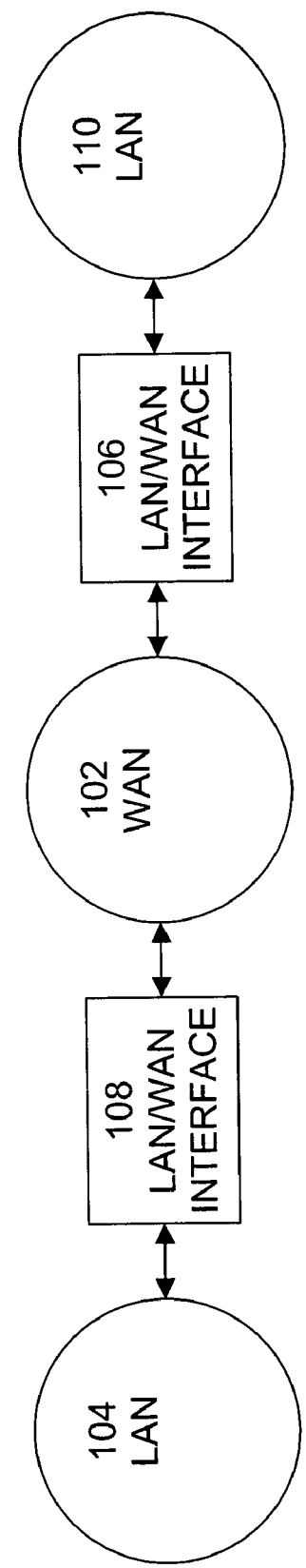
FIG. 1 is an exemplary block diagram of a communications system in which the present invention may be implemented.

An exemplary block diagram of a communications system 100 in which the present invention may be implemented is shown in FIG. 1. System 100 includes a Wide Area Network 102 (WAN), one or more Local Area Networks 104 and 106 (LAN), and one or more LAN/WAN interfaces 108 and 110. A LAN, such as LANs 104 and 106, is computer network that spans a relatively small area. Most LANs connect workstations and personal computers. Each node (individual computer) in a LAN has its own CPU with which it executes programs, but it also is able to access data and devices anywhere on the LAN. This means that many users can share expensive devices, such as laser printers, as well as data. Users can also use the LAN to communicate with each other, by sending e-mail or engaging in chat sessions.

There are many different types of LANs, Ethernets being the most common for Personal Computers (PCs). Most Apple Macintosh networks are based on Apple's AppleTalk network system, which is built into Macintosh computers.

Most LANs are confined to a single building or group of buildings. However, one LAN can be connected to other LANs over any distance via longer distance transmission technologies, such as those included in WAN 102. A WAN is a computer network that spans a relatively large geographical area. Typically, a WAN includes two or more local-area networks (LANs), as shown in FIG. 1. Computers connected to a wide-area network are often connected through public networks, such as the telephone system. They can also be connected through leased lines or satellites. The largest WAN in existence is the Internet.

Among the technologies that may be used to implement WAN 102 are optical technologies, such as Synchronous Optical Network (SONET) and Synchronous Digital Hierarchy (SDH). SONET is a standard for connecting fiber-optic transmission systems. SONET was proposed by Bellcore in the middle 1980s and is now an ANSI standard. The standard defines a hierarchy of interface rates that allow data streams at different rates to be multiplexed. SONET establishes Optical Carrier (OC) levels from 51.8 Mbps (about the same as a T-3 line) to 2.48 Gbps. Prior rate standards used by different countries specified rates that were not compatible for multiplexing. With the implementation of SONET, communication carriers throughout the world can interconnect their existing digital carrier and fiber optic systems.

SDH is the international equivalent of SONET and was standardized by the International Telecommunications Union (ITU). SDH is an international standard for synchronous data transmission over fiber optic cables. SDH defines a standard rate of transmission at 155.52 Mbps, which is referred to as STS-3 at the electrical level and STM-1 for SDH. STM-1 is equivalent to SONET's Optical Carrier (OC) levels −3.

In this document, a number of embodiments of the present invention are described as incorporating SONET. Although, for convenience, only SONET embodiments are explicitly described, one of skill in the art would recognize that all such embodiments may incorporate SDH and would understand how to incorporate SDH in such embodiments. Therefore, wherever SONET is used in this document, the use of either SONET or SDH is intended and the present invention is to be understood to encompass both SONET and SDH.

LAN/WAN interfaces 108 and 110 provide electrical, optical, logical, and format conversions to signals and data that are transmitted between a LAN, such as LANs 104 and 106, and WAN 102.

Figure 2:
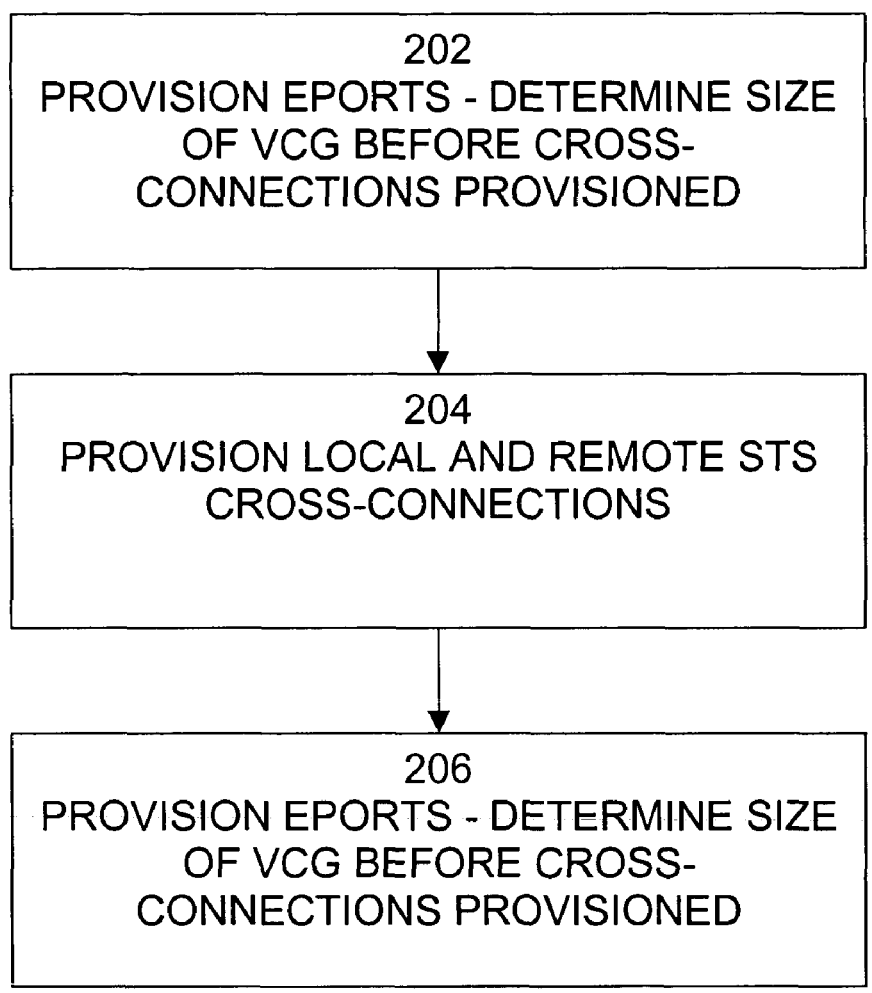
FIG. 2 is an exemplary flow diagram of a process of provisioning and setting up an end-to-end circuit in a communications system such as that shown in FIG. 1.
Figure 3:
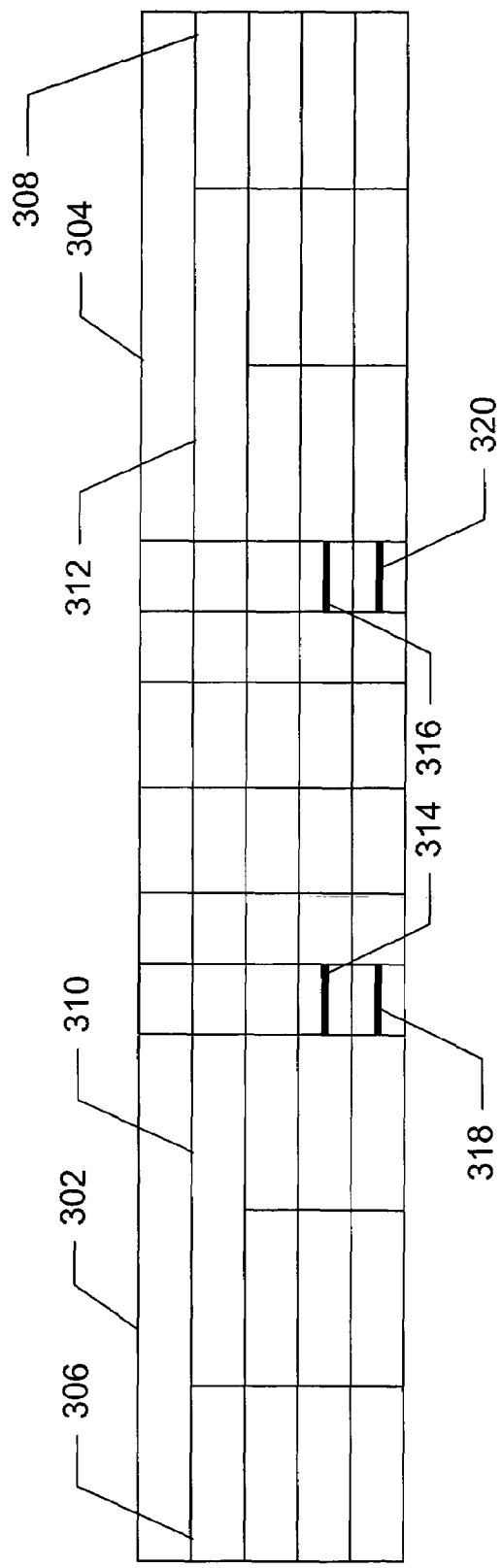
FIG. 3 is an example of connections and setup that are provisioned by the process shown in FIG. 2.

A process 200 of provisioning and setting up an end-to-end circuit in a communications system, such as that shown in FIG. 1, is shown in FIG. 2. It is best viewed in conjunction with FIGS. 3-5, which illustrate an example of the connections and setup that are provisioned. Referring to FIGS. 2 and 3, process 200 begins with step 202, in which local 302 and remote 304 EPORT facilities are provisioned. Each EPORT facility communicates data between an Ethernet WAN, connected over WANLINKs 306 and 308. In this example, EPORTs 302 and 304 implement a virtual concatenation group (VCG) 310 and 312 including two members. Each VCG member includes a transmit element (TX-Source) and a receive element (RX-Sink). The size (number of members) of the LCAS VCG 310 and 312 is determined by the EPORT facility 302 and 304 provisioning before any local VT/STS cross connections are provisioned. Thus, in step 202, links 314, 316, 318, and 320 do not include VT/STS cross connections. VCG members that are not associated with a local VT/STS cross connection (unequipped) return an LCAS sink status of FAIL. VCG members that are not associated with a local VT/STS cross connection (unequipped) enter an operational LCAS source state of DNU. Thus, in step 202, which is before the VT/STS cross connections and the SONET transport network are provisioned, the VCG members have an LCAS sink status of FAIL and an operational LCAS source state of DNU.

Figure 4:
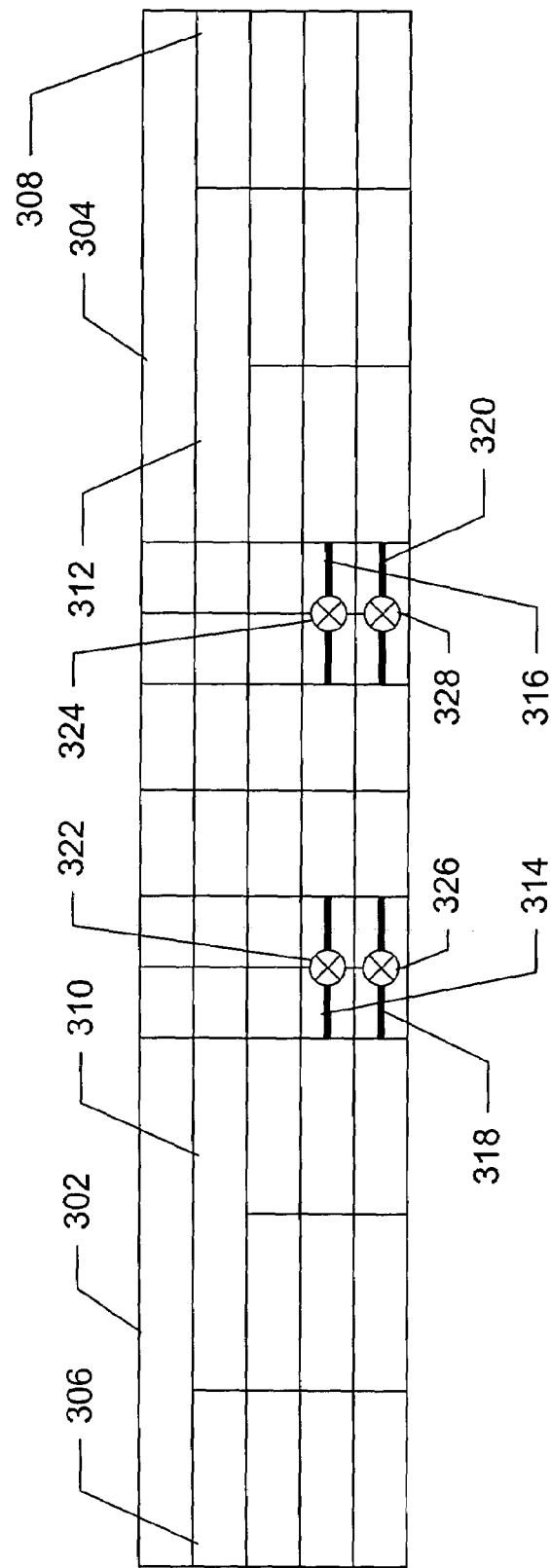
FIG. 4 is an example of connections and setup that are provisioned by the process shown in FIG. 2.

Referring to FIGS. 2 and 4, in step 204, the local and remote STS cross-connections 322, 324, 326, and 328 are provisioned. In step 204, which is before the SONET transport network is provisioned, the VCG members have an LCAS sink status of FAIL and an operational LCAS source state of DNU.

Figure 5:
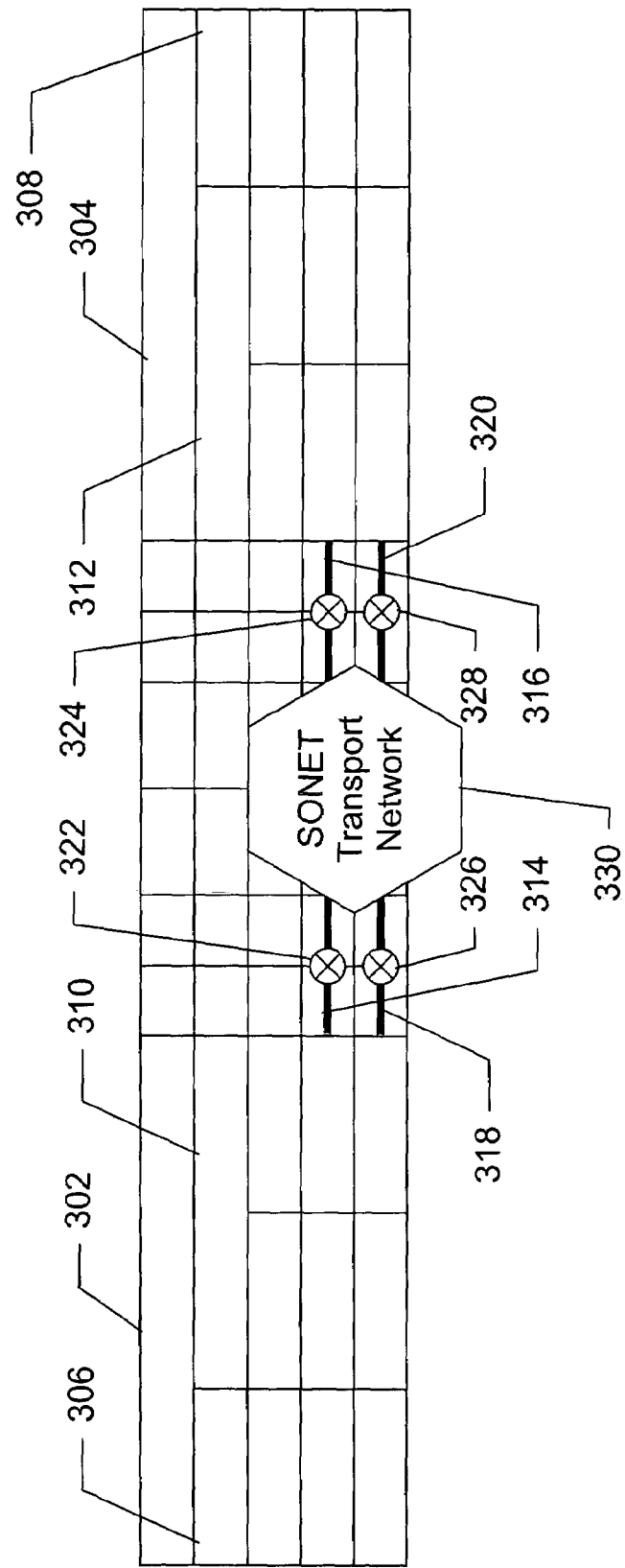
FIG. 5 is an example of connections and setup that are provisioned by the process shown in FIG. 2.

Referring to FIGS. 2 and 5, in step 206, the SONET transport network cross-connections 330 are provisioned. Once SONET transport network cross-connections 330 are provisioned, EPORTs 302 and 304 detect the presence of the connection. Using the LCAS source and sink adaptation functions, EPORTs 302 and 304 automatically activating the STSs and members in the VCG. Thus, the LCAS source and sink adaptation functions cause the VCG members to have an LCAS sink status of OK and an operational LCAS source state of NORM or EOS.

The present invention is partly based on industry standard LCAS protocol (ITU-G.7042), but provides automatic removal/recovery procedures along with the following extensions:

1) The size (number of members) of the LCAS VCG is determined by the Ethernet port (EPORT) facility provisioning before any local VT/STS cross connections are provisioned.
2) VCG members that are not associated with a local VT/STS cross connection (unequipped) return an LCAS sink status of fail.
3) VCG members that are not associated with a local VT/STS cross connection (unequipped) enter an operational LCAS source state of DNU.

The SONET LCAS employs source and sink adaptation functions to control a given Virtual Concatenation Group (VCG) by activating or deactivating members in the group so as to increase or decrease of bandwidth of the VCG. The operation of LCAS is uni-directional. This means that in order to bi-directionally activate or deactivate channels, the procedure has to be repeated in the opposite direction. These actions are independent of each other and therefore not are required to be synchronized.

While current standard recommendations (ITU-G.7042) for LCAS allow for the hitless addition and removal of bandwidth under control of a management system, this feature is not necessary to practicing the present invention. However, preferably, the present invention supports the LCAS feature wherein a failed VC group member will be autonomously, "temporarily removed" from the group. When the failure condition is remedied, LCAS will restore (recover) the channel back into the group. The temporary removal of a VC group member due to path layer failures will in general not be hitless for the service carried over the VC group. The autonomous restoration, after a failure is repaired, is hitless. (This is true to the extent that the service being carried over the VC group refrains from attempting to use the additional bandwidth of the restored VC group until the restoration is complete.)

For the implementation of LCAS of this embodiment of the present invention, those VCG members with an associated cross-connect are permitted to become "active". VCG members without an associated local cross-connection are immediately placed in a state of "temporary removal". Once the remote Link Capacity Adjust Scheme Network Connection peer is provisioned, EPORT data is transported over the active VCG members via the provisioned STS's.

LCAS employs a number of protocol-bytes carried in the STS/VT path overhead across the VC multiframe structure from the signal the Source of a VCG member from its corresponding Sink. Each VCG member has its own instance of the LCAS protocol-bytes. The following table lists the LCAS protocol-bytes used by the present invention are shown in FIG. 6. It is to be noted that a complete set of Member Status information is sent by all Sink members via their corresponding source path. This means as long as one path back to the source is functional the Member Status information will be received by the Source.

The possible values for the CTRL protocol-byte that is transmitted for each VC group member from its Source to its Sink are in some cases one-to-one mapped to the Source member state. These states are shown in FIG. 7, along with the CTRL designations, the actual values of CTRL transmitted in the VC overhead, and whether a particular LCAS state or CTRL value is used in this embodiment of the present invention.

The possible values for a VCG member's status (controlled by Sink VCG) are in some cases one-to-one mapped to the Sink state of that member. This is shown in FIG. 8, which lists the Sink states, the member status designations, the actual values of member status, and whether a particular sink state or status value is used in this embodiment of the present invention.

For the purposes of describing the source and sink state machines (for VCG members), the notational conventions for control messages that are shown in FIG. 9 will be used. Messages that are not supported by this embodiment of the present invention are not sent or ignored upon receipt unless otherwise noted.

It is to be noted that the status of all sink ends is returned to the source end in each return STS-N. The source end can, for example, read the information from member #1 and if that is unavailable the same information from member #2 etc. As long as no return bandwidth is available, the source end will use the last received valid status.

The LCAS source state machine to be supported by each VCG member(i) is shown in FIG. 10. This state machine does not support the S-IDLE, S-ADD, and S-REMOVE states as currently documented in the industry standard, ITU-G.7042. It is to be noted that simultaneous stimulus messages are handled according to their priority and may require multiple state machine transitions.

The LCAS sink state machine supported by this each VCG member(i) is shown in FIG. 11. This state machine does not support the S-IDLE states as currently documented in the industry standard, ITU-G.7042.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of provisioning a circuit comprising the steps of:
   provisioning an Ethernet port facility, including determining members of a Link Capacity Adjustment Scheme Virtual Concatenation Group before virtual tributary or synchronous transport signal cross connections are provisioned and before Synchronous Optical Network or Synchronous Digital Hierarchy cross-connections are provisioned;
   provisioning virtual tributary or synchronous transport signal cross connections; and
   provisioning Synchronous Optical Network or Synchronous Digital Hierarchy cross-connections after provisioning virtual tributary or synchronous transport signal cross connections,
   wherein each member in the Link Capacity Adjustment Scheme Virtual Concatenation Group returns a Link Capacity Adjustment Scheme sink status of FAIL before virtual tributary or synchronous transport signal cross connections are provisioned and before Synchronous Optical Network or Synchronous Digital Hierarchy cross-connections are provisioned and at least one member in the Link Capacity Adjustment Scheme Virtual Concatenation Group returns a Link Capacity Adjustment Scheme sink status of OK after the Synchronous Optical Network or Synchronous Digital Hierarchy cross-connections are provisioned.

2. The method of claim 1, wherein the method further comprises the step of:
   using Link Capacity Adjustment Scheme source and sink adaptation functions, automatically activating the Virtual Concatenation Group members.

3. The method of claim 2, wherein the step of using Link Capacity Adjustment Scheme source and sink adaptation functions, automatically activating the Virtual Concatenation Group members comprises the step of:
   causing the Virtual Concatenation Group members to have an Link Capacity Adjustment Scheme sink status of OK and an operational Link Capacity Adjustment Scheme source state of NORM or EOS after the Synchronous Optical Network or Synchronous Digital Hierarchy cross-connections are provisioned.

4. A system for provisioning a circuit comprising:

means for provisioning an Ethernet port facility, including determining members of a Link Capacity Adjustment Scheme Virtual Concatenation Group before virtual tributary or synchronous transport signal cross connections are provisioned and before Synchronous Optical Network or Synchronous Digital Hierarchy cross-connections are provisioned;

means for provisioning virtual tributary or synchronous transport signal cross connections; and means for provisioning Synchronous Optical Network or Synchronous Digital Hierarchy cross-connections after provisioning virtual tributary or synchronous transport signal cross connections, wherein each member in the Link Capacity Adjustment Scheme Virtual Concatenation Group returns a Link Capacity Adjustment Scheme sink status of FAIL before virtual tributary or synchronous transport signal cross connections are provisioned and before Synchronous Optical Network or Synchronous Digital Hierarchy cross-connections are provisioned and at least one member in the Link Capacity Adjustment Scheme Virtual Concatenation Group returns a Link Capacity Adjustment Scheme sink status of OK after the Synchronous Optical Network or Synchronous Digital Hierarchy cross-connections are provisioned.

5. The system of claim 4, wherein the method further comprises the step of:

means for using Link Capacity Adjustment Scheme source and sink adaptation functions, automatically activating the Virtual Concatenation Group members.

6. The system of claim 5, wherein the step of using Link Capacity Adjustment Scheme source and sink adaptation functions, automatically activating the Virtual Concatenation Group members comprises the step of:

means for causing the Virtual Concatenation Group members to have an Link Capacity Adjustment Scheme sink status of OK and an operational Link Capacity Adjustment Scheme source state of NORM or EOS after the Synchronous Optical Network or Synchronous Digital Hierarchy cross-connections are provisioned.

* * * * *